(12) United States Patent
Gleine et al.

(10) Patent No.: US 6,394,396 B2
(45) Date of Patent: May 28, 2002

(54) AERODYNAMIC NOISE REDUCING STRUCTURE FOR AIRCRAFT WING SLATS

(75) Inventors: Wolfgang Gleine, Kakensdorf; Knut Mau; Udo Carl, both of Hamburg, all of (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 09/837,638

(22) Filed: Apr. 17, 2001

(30) Foreign Application Priority Data

Apr. 17, 2000 (DE) .......................... 100 19 185

(51) Int. Cl.[7] ............................... B64C 3/00
(52) U.S. Cl. ...................... 244/198; 244/1 N; 244/199; 244/201
(58) Field of Search ................. 244/1 N, 198, 244/199, 201, 207, 208, 210, 213, 214, 216

(56) References Cited

U.S. PATENT DOCUMENTS

| | | | |
|---|---|---|---|
| 3,968,946 A | | 7/1976 | Cole |
| 4,285,482 A | * | 8/1981 | Lewis ........................ 244/207 |
| 4,702,441 A | | 10/1987 | Wang |
| 5,056,741 A | * | 10/1991 | Bliesner et al. ............. 244/214 |
| 6,135,395 A | * | 10/2000 | Collett ........................ 244/209 |
| 6,152,404 A | | 11/2000 | Flaig et al. |
| 6,328,265 B1 | * | 12/2001 | Dizdarevic .................. 244/213 |

OTHER PUBLICATIONS

Article entitled: "Airframe Noise Studies on Wings with Deployed High–Lift Devices", by Werner Dobrzynski et al.; 1998; Deutsches Zentrum für Luft—und Raumfahrt e.V. (DLR) Institute für Entwurfsaerodynamik Abteilung Technishe Akustik, Forschungszentrum Braunschweig, Germany; American Institute of Aeronautics and Astronautics, pp. 1 to 17.

* cited by examiner

Primary Examiner—Michael J. Carone
Assistant Examiner—Gabriel S Sukman
(74) Attorney, Agent, or Firm—W. F. Fasse; W. G. Fasse

(57) ABSTRACT

A hollow expandable and contractible displacement element is secured onto the concave rear surface of a slat facing the leading edge of an aircraft wing. A bleed air line supplies engine bleed air into the hollow displacement element to selectively expand or contract the displacement element, which is preferably elastically expandable. When the slat is extended, the displacement element is expanded to fill-out the concave cavity on the rear surface of the slat so as to prevent formation of a vortex in the slat air gap and thereby to reduce aero-acoustic noise. When the slat is retracted, the displacement element is contracted to be conformingly accommodated in the sickle-shaped space between the slat and the leading edge of the wing.

24 Claims, 3 Drawing Sheets

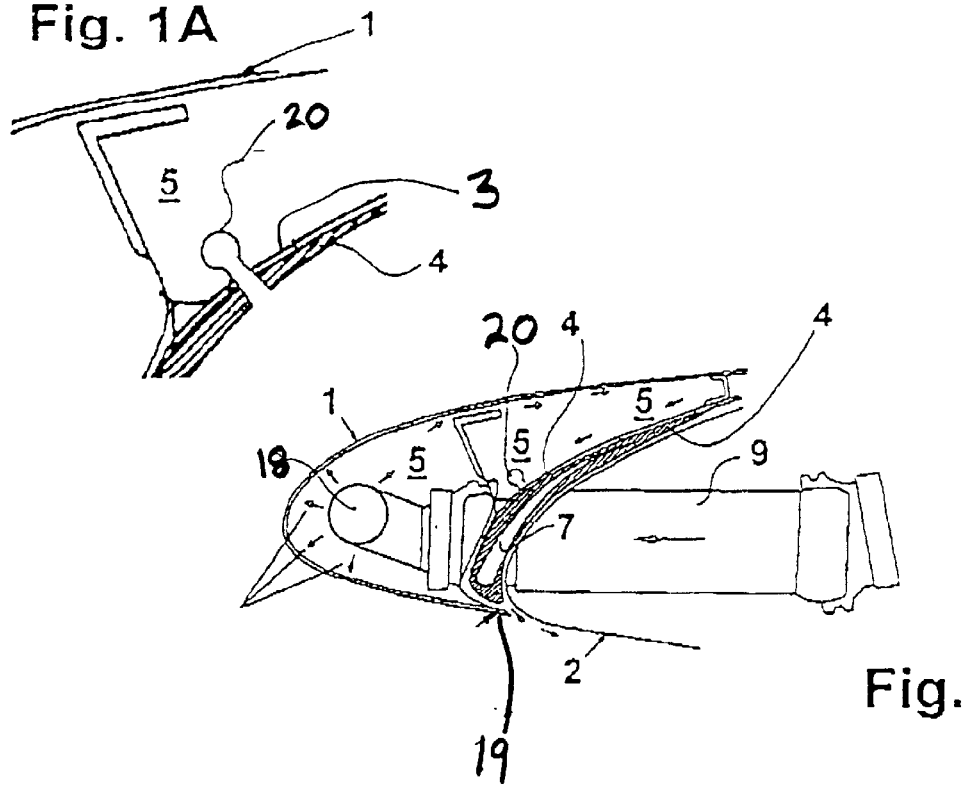
Fig. 1A
Fig. 1
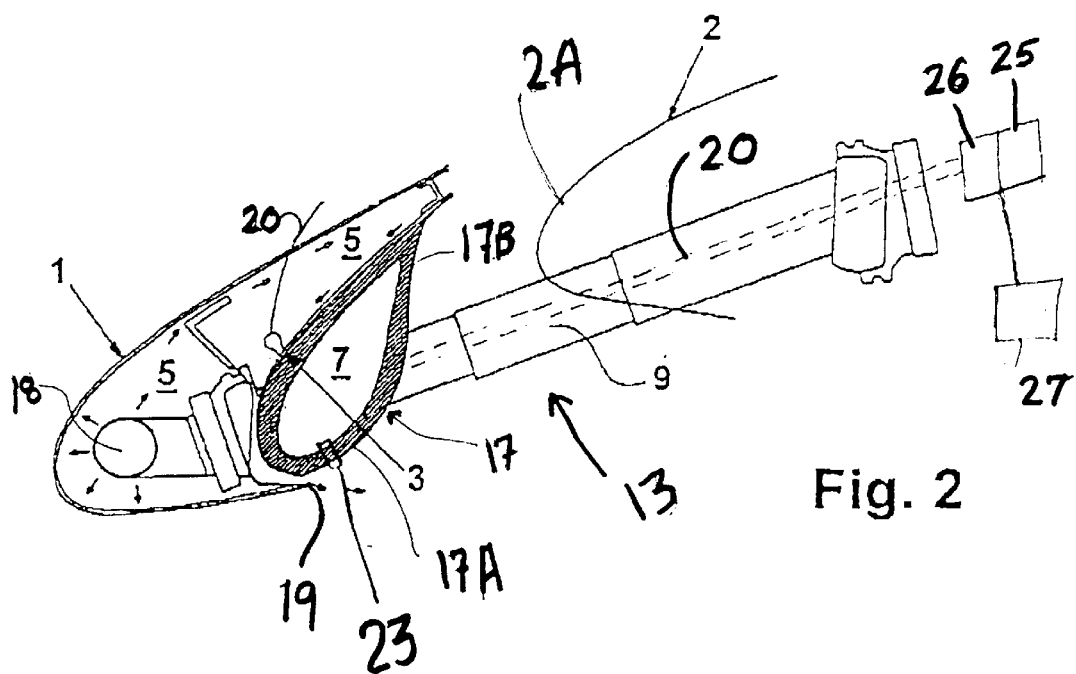
Fig. 2

AERODYNAMIC NOISE REDUCING STRUCTURE FOR AIRCRAFT WING SLATS

PRIORITY CLAIM

This application is based on and claims the priority under 35 U.S.C. §119 of German Patent Application 100 19 185.1, filed on Apr. 17, 2000, the entire disclosure of which is incorporated herein by reference.

FIELD OF THE INVENTION

The invention relates to a structural arrangement for aerodynamic noise reduction in connection with leading edge slats on the wings of commercial transport aircraft. Particularly, the structure provides an aerodynamic effect on a wing slat in order to reduce the noise generated by air flowing around the slat, and through the air gap between the slat and the leading edge of the wing, especially during take-off and landing phases of flight of an aircraft.

BACKGROUND INFORMATION

Various noise sources contribute to the total noise generated during the flight of a modern commercial transport aircraft.

Among the various noise sources, aero-acoustically generated noise that results from the flow pattern of air around the aircraft structure is becoming an evermore significant portion of the total flight noise. This is because the noise generated by other sources such as the engines has been reduced in recent years by technical advances of those components. In present day commercial transport aircraft, it is roughly estimated that approximately 50% of the total flight noise during a landing approach is generated by the flow of air around the aircraft structure, while the other half of the total noise is generated by the engines.

Further improvements, i.e. reductions, in the noise generated by the engines are only practically and economically efficacious if similar technical advances for reducing the aerodynamic flow noise around the aircraft fuselage can be simultaneously achieved. It is becoming especially important to reduce the aerodynamic flow noise in view of ever stricter noise level limits, especially around airports with a high aircraft traffic volume. A major factor contributing to the total aerodynamic flow noise during landing and take-off of a modern commercial transport aircraft, is the noise generated by the airflow around high-lift slats deployed from the leading edges of the wings during the landing and take-off phases.

To facilitate an understanding of the aerodynamic noise generated in connection with the leading edge slats, FIG. 4 of the present application shows representative streamlines of the air A flowing around a generally conventional wing, which is schematically shown in section. The wing arrangement includes a main wing 2, a leading edge slat 1 that is extended or deployed forward of the leading edge of the main wing 2, and a landing flap 11 that is extended or deployed rearward from the trailing edge of the main wing 2. Throughout this specification, the term "forward" and the like refers to the normal forward flight direction of the aircraft, for example the direction in which the aircraft nose and the wing leading edges are oriented. As is generally known, the extended slat 1 and landing flap 11 change the effective camber and angle of attack of the airfoil profile of the wing structure, and also influence the airflow over the surfaces of the wing, so as to increase the lift, e.g. for landing and takeoff. In this extended configuration, the slat 1 is deployed forwardly and downwardly from the leading edge nose 2A of the main wing 2 so as to form a slat air gap 13 between a rearwardly facing concave curved surface 3 of the slat 1 and the convexly profiled leading edge nose 2A of the main wing 2.

On the other hand, during cruise flight, the slat 1 is retracted into a retracted position (not shown) directly on the leading edge nose 2A of the main wing 2 so as to reduce the aerodynamic drag and avoid unnecessary increased lift. In this context, the leading edge slat 1 must be retracted smoothly and flushly against the leading edge nose 2A of the main wing 2, so as to form a substantially continuous aerodynamic contour. Namely, the slat 1 is adjacent to the leading edge nose 2A, with at most only a small, aerodynamically insignificant, gap or space therebetween. Therefore, the rear concavely curved surface 3 of the leading edge slat 1 has a profile curvature substantially matching that of the leading edge nose 2A of the main wing 2, so that the slat 1 smoothly matches or mates onto the leading edge nose 2A of the main wing 2 without a resistance-causing gap or discontinuity therebetween.

Unfortunately, the profile curvature of the rear concave surface 3 of the slat 1 may be optimal for mating onto the leading edge nose 2A of the main wing 2 in the retracted position, but it is not optimal for the airflow through the slat air gap 13 between the leading edge nose 2A and the slat 1 in its deployed position as shown in FIG. 4. As a result, the airflow A forms an eddy or vortex 15 that extends lengthwise along the length of the slat 1 (i.e. in the wing span direction). This vortex 15 involves the turbulent eddy recirculation of air in the hollow space defined and bounded by the rear concave curvature 3 of the slat 1, whereby this space generally has a tapered concave shape or tear-drop shape. This vortex 15 further exhibits or generates a fluctuating fluid pressure field of the affected airflow, which is believed to be the cause of the aerodynamic noise generated in this area. Noise measurements in an aero-acoustic wind tunnel have confirmed that a significant reduction of the noise generated by the extended slat can be achieved by arranging a rigid fairing or filler member in the space along the rear concave curvature 3 of the slat 1, which would otherwise be occupied by the vortex 15.

Attempts have been made in the prior art to reduce the aerodynamically generated noise, especially in connection with the slats and the mounting thereof. For example, a study in this regard was published by Werner Dobrzynski and Burkhard Gehlhar entitled "Airframe Noise Studies on Wings with Deployed High-Lift Devices", from the Deutsches Zentrum fuer Luft und Raumfahrt e.V. (DLR), Institut fuer Entwurfsaerodynamik, Abteilung Technische Akustic, Forschungszentrum Braunschweig, Germany, at the Fourth American Institute of Aeronautics and Astronautics AIAA/ CEAS Aeroacoustics Conference on Jun. 2 to 4, 1998 in Toulouse, France.

Among other things, this study disclosed a proposed noise reducing arrangement in which a sheet metal guide member is pivotally connected to the slat in the area of the concavely curved rear or inner surface of the slat facing toward the leading edge nose of the main wing. This sheet metal air guide can be pivoted relative to the slat. Particularly, the air guide member can be extended or deployed relative to the slat during take-off and landing when the slat is deployed relative to the wing. On the other hand, the sheet metal air guide member will be pivoted against the slat during cruise flight when the slat is to be retracted relative to the wing. While such a proposed solution may have achieved a reduction of aerodynamically generated noise in wind tunnel tests, it is considered that such a solution could never be practically carried out in an actual aircraft construction, for practical reasons.

For example, in the previously proposed arrangement, when the slat is retracted against the leading edge nose of the main wing for cruise flight, the gap between these two components is not sufficiently large for accommodating a rigid air guide member tilted or pivoted inwardly against the rear surface of the slat. On the other hand, if the gap is made larger to accommodate the air guide member, then a disadvantageous aerodynamic gap or discontinuity would be formed along the aerodynamic contour provided by the slat and the wing in combination. Moreover, if a flexible air guide component is provided, which is to be adapted against the inner contour of the slat in the retracted position, then such a component would not have sufficient strength and stiffness in order to withstand the aerodynamic forces in the deployed condition.

Moreover, such a guide element would be expected to have a tendency to flutter due to the alternating aerodynamic pressure effect, or simply due to a failure to remain sufficiently rigid to withstand the aerodynamic forces. Namely, the proposed sheet metal separating surface or air guide member will be subjected to considerable fluctuating aerodynamic forces, which will presumably excite vibrations or oscillations in the member, since it is only to be pivotally connected to the lower edge of the slat without any further stiffening means. Such fluttering generates a significant noise radiation, which is directly contrary to the object of reducing the noise. Furthermore, a pivotally connected sheet metal member requires additional mechanical movable parts, which leads to an increased total weight of the aircraft, as well as increased manufacturing and maintenance costs. It would also be necessary to construct the pivot joint in such a manner that the transition from the underside of the slat to the joint of the separating surface is free of contour discontinuities or gaps, which makes it necessary to achieve a very high manufacturing accuracy.

Additional problems arise because the contour of the rear surface of the slat as well as the geometry of the slat air gap change over the span width of the wing, so that the air guide element or elements must be configured with a bend or twist along the length thereof, whereby the tilting and retracting mechanism becomes further complicated.

A failure situation, for example involving a blockage of the mechanical system of the slat arrangement, would become very critical, because then the slat could no longer be retracted if the air guide member is blocked or jammed in its deployed or extended position.

The above mentioned conference proceedings provide no suggestions toward overcoming the just mentioned significant problems and disadvantages in actually trying to carry out the proposed solution using a pivotable air guide member in practice.

SUMMARY OF THE INVENTION

In view of the above, it is an object of the invention to provide a structure for reducing the aero-acoustically generated noise of the air flowing around a slat, which significantly reduces the noise generation on the slat of a commercial transport aircraft, without disadvantageously influencing the aerodynamic characteristics such as the lift and the air resistance of the wing.

Moreover, the structure or arrangement should be failsafe, so that in the event of a total or partial failure of the arrangement, no dangerous effects that would influence the further flight of the aircraft may arise. Furthermore, the inventive structural arrangement shall entirely avoid the use of movable mechanical elements and elements that significantly increase the total weight of the aircraft. The inventive structural arrangement shall also be easily installable or even retrofittable into existing aircraft, and have a simple and minimal maintenance requirement. The invention further aims to avoid or overcome the disadvantages of the prior art, and to achieve additional advantages, as apparent from the present specification.

The above objects have been achieved according to the invention in an aircraft wing arrangement including a main wing and a slat that is movably connected to the main wing so as to be movable between an extended position in which the slat extends forwardly of the leading edge nose of the wing and a retracted position in which the slat is arranged adjacent to the leading edge nose. Particularly according to the invention, the aircraft wing arrangement includes an improved structure for reducing aero-acoustically generated noise, comprising a displacement element (which is especially and preferably an expandable displacement element such as a hollow bellows or inflatable elastic displacement element) that is arranged on the concavely curved rear surface of the slat that faces toward the leading edge nose of the main wing. The inventive improvement further comprises a pressure conduit such as a bleed air line that communicates with a hollow space in the displacement element so as to selectively expand or contract the displacement element. The terms "conduit", "line", etc. refer generally to any duct, hose, pipe, tube, channel, conduit or the like through which a fluid may be conveyed. Any available pressurized fluid and preferably pressurized air can be used to selectively expand the displacement element. Preferably, compressed bleed air from the engine or engines of the aircraft is controlledly supplied into the expandable displacement element.

When the displacement element is completely contracted, it is rather thin and contracted against the concave rear surface of the slat, so that it can be accommodated in the crescent-shaped or sickle-shaped space (referring to the cross-sectional shape) between the slat and the leading edge nose of the main wing when the slat is fully retracted. On the other hand, when the displacement element is fully expanded, it preferably has a substantially teardrop shaped cross-section, which protrudes rearwardly from the concavely curved rear surface of the slat and forms a protruding convexly curved surface of the displacement element that faces the leading edge nose of the main wing. Thus, when the slat is in the extended position, the slat air gap between the slat and the leading edge nose of the main wing is bounded between the convexly curved rear surface of the expandable displacement element and the aerodynamically convexly curved profile contour of the leading edge nose. The rear surface of the expandable displacement element may further have a compound curvature including convex and concave portions, to optimize the flow configuration of the slat air gap.

The inventive improved structure achieves several advantages. The expandable displacement element improves or even optimizes the flow configuration of the slat air gap, so that the aerodynamic effectiveness of the slat can be improved, and especially so that the formation of a vortex on the rear surface of the slat is avoided, thereby significantly reducing the aero-acoustic generation of noise from the slat. On the other hand, when the expandable displacement element is deflated and thus contracted, it is rather thin and conformable to the concavely curved contour of the rear surface of the slat, so that it can be compactly accommodated between the slat and the leading edge nose of the wing when the slat is in the fully retracted position. In this configuration, the displacement element flexibly deformably adapts to the available space between the retracted slat and the leading edge nose of the wing and thus advantageously fills any gap remaining between the slat and the wing. The structure is economical and simple to fabricate and to install, and may even be easily retrofitted onto existing aircraft. The added weight is quite low. The arrangement provides a fail-safe operation, whereby even a complete failure of the arrangement will not hinder the normal retraction or extension of the slat relative to the wing.

BRIEF DESCRIPTION OF THE DRAWINGS

In order that the invention may be clearly understood, it will now be described in connection with example embodiments, with reference to the accompanying drawings, wherein:

FIG. 1 is a schematic cross-sectional view of a slat in a retracted position relative to a main wing, with an expandable displacement element arranged on a rear surface of the slat being in a contracted or deflated condition;

FIG. 1A is an enlarged detail view of a portion of FIG. 1, especially showing a bleed air line supplying bleed air into the expandable displacement element;

FIG. 2 is a schematic sectional view of the arrangement of FIG. 1, but with the slat in an extended position and the displacement element in an expanded condition;

DETAILED DESCRIPTION OF PREFERRED EXAMPLE EMBODIMENTS AND OF THE BEST MODE OF THE INVENTION

Figure 4:
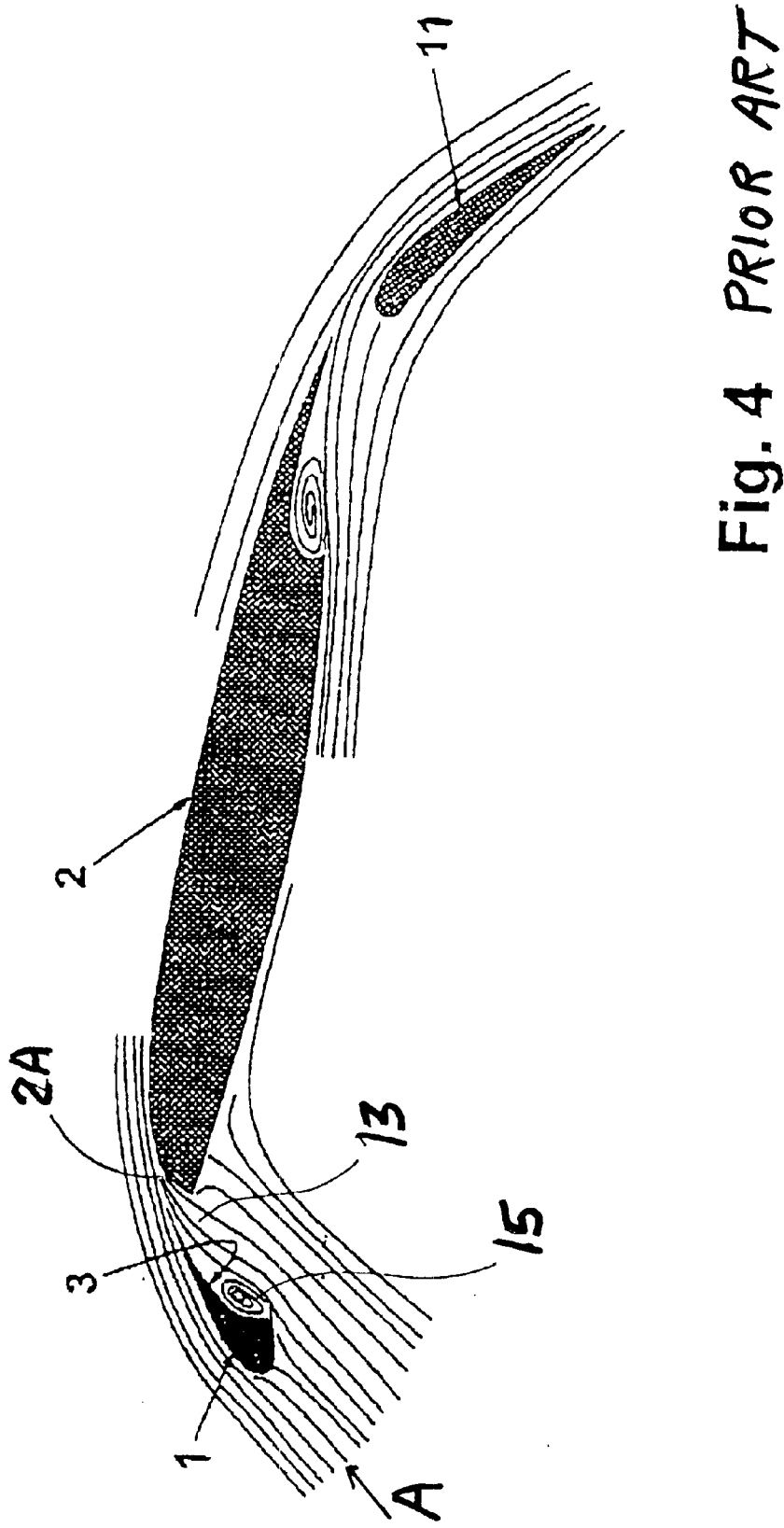
FIG. 4 is a schematic cross-sectional view of a conventional wing arrangement showing the air streamlines that prevail when a slat and a landing flap are extended.

The general structure of a main wing 2 with an extended high-lift slat 1 and an extended landing flap 11, as well as the aerodynamic flow streamlines A associated therewith, in a conventional arrangement, have been discussed above in connection with FIG. 4. The point of the invention is especially to avoid or reduce the formation of the vortex 15 along the slat 1 while improving the aerodynamic configuration of the slat air gap 13 when the slat 1 is in the extended position, while still allowing a proper full retraction of the slat 1 against the leading edge nose 2A of the main wing 2. The inventive arrangement shall not have disadvantageous influences on the aerodynamic characteristics, such as the lift and the aerodynamic resistance, but rather actually improves these aerodynamic characteristics.

The inventive structural arrangement will now be described in connection with FIGS. 1 to 3. The key components of the inventive structural arrangement are a hollow displacement element 4, and a pressurized fluid line such as a bleed air line 20 that provides compressed bleed air selectively into the hollow displacement element.

The displacement element 4 is particularly expandable and is arranged and secured on the concavely curved rear facing surface 3 of the slat 1. Preferably, the displacement element 4 is a hollow body that is inflatable so as to be selectively blown-up or expanded by a pressure medium selectively introduced therein from the pressure medium line, e.g. the bleed air line 20, as will be described in greater detail below. In the illustrated embodiment, the displacement element 4 is an inflatable, elastically expandable hollow bag or bellows element comprising an elastically stretchable material that is substantially gas-tight. Alternatively, the material of the displacement element 4 need not be elastically stretchable, but instead may merely be flexibly deformable so as to be inflatable to an expanded inflated condition and contractible to a deflated or contracted condition, without stretching and shrinking.

Preferably, the displacement element 4 extends longitudinally along the entire length of the slat 1 in the span direction, and extends vertically along or covers the entire concavely curved rear surface 3 of the slat 1 facing toward the leading edge nose 2A of the wing 2. The displacement element 4 may be secured to the slat 1 by any conventionally known means, but preferably is adhesively bonded in a fully surfacial manner to the entire concave contoured rear surface 3 of the slat 1 using any suitable adhesive. Thereby, the expandable displacement element 4 does not require any additional mechanical supports, guide members, mountings, or actuators for securing the displacement element 4 to the slat 1, or for selectively deploying the displacement element 4 between its expanded condition and its contracted condition.

Instead, the displacement element 4 is simply constructed and adapted to be two- or three-dimensionally expandable into the appropriately contoured expanded shape as shown in FIG. 2, and to be contractible into the contracted shape shown in FIG. 1. To achieve this, the material of the element 4 is preferably form-stable to maintain the desired specified configuration, especially in the expanded condition. This may be achieved, for example, with an appropriately layered or composite material, for example including a shape-retaining mesh or woven fabric bag in combination with a gas-tight membrane layer. Also, the wall thickness of the walls of the displacement element 4 is appropriately dimensioned, and may be non-uniform with different wall thicknesses in different areas, in order to provide the appropriate shape respectively when the displacement element 4 is in the contracted condition as shown in FIG. 1 and/or in the expanded condition as shown in FIG. 2.

Preferably, at least the outer rear surface 17 of the displacement element 4 facing away from the slat 1 and generally toward the wing 2 further includes an outer layer of an abrasion resistant material to provide protection against mechanical damage as well as attack by aggressive agents such as environmental pollutants, possible exhaust gases, spilled fuel, hydraulic oil, or the like, and generally to increase the durability, wear resistance, and operating life of the displacement element 4, with a low maintenance and upkeep requirement. For example, a high strength and abrasion resistant woven fabric can be laminated onto the wall material of the displacement element 4 on the rear surface 17 thereof. This layer can further provide the expanding and shrinking function of an elastic membrane while defining the contour shape of the element 4. Moreover, this membrane constrains and protects the displacement element 4 against bursting in the event of over-pressurization thereof. In any event, the material or materials, the geometry, and the pressurization of the displacement element 4 are selected in such a manner that the inflated element 4 will be form-stable and maintain the proper contour shape without fluttering even in the event of pressure fluctuations of the air flowing through the slat air gap 13.

As mentioned above, a pressure medium, and preferably compressed engine bleed air, is selectively provided into the hollow space of the displacement element 4 so as to selectively contract the element into the contracted condition shown in FIG. 1, or to expand the element into the expanded condition shown in FIG. 2, or to adjustably partially expand the element 4 to any intermediate condition to achieve the required contour shape thereof to optimize the aerodynamic flow conditions through the slat air gap 13 under different flight conditions or configurations. To achieve this, any suitable bleed air line is connected from the bleed air system of the aircraft into a hollow space 7 within the expandable displacement element 4.

As shown in FIGS. 1 and 2, a telescoping tube 9 is connected between the slat 1 and the wing 2, and may movably or extendably mount the wing 1 on the wing 2. This telescoping tube 9 additionally conveys hot engine bleed air through an air duct 18 into an air plenum space 5 within the hollow interior of the slat 1. This portion of hot bleed air heats the slat 1 and may then be exhausted out of an exhaust blowing opening 19, both for the purpose of de-icing, for example. Another portion of engine bleed air can be separately conveyed, for example through a separate air line extending in the telescoping tube 9, to a bleed air line 20 that extends longitudinally at least discontinuously or sectionwise in the hollow plenum space 5 within the slat 1, and from there penetrates through the rear surface 3 of the slat 1 and through the adjoining wall of the displacement element 4, to communicate into the hollow space 7 within the element 4, as shown in detail in FIG. 1A. In this manner, a bleed air supply with appropriate control and pressure regulation is provided for selectively inflating or contracting the displacement element 4, completely separately from the hot bleed air supply that is blown into the plenum space 5 of the slat 1 for the purpose of de-icing.

The pressurized fluid may be provided from any pressurized fluid source in the aircraft, but is preferably engine bleed air from the aircraft bleed air system, which taps compressed bleed air from the compressor stages of the main engines and/or an auxiliary power unit engine of the aircraft. Then, from the bleed air system, the compressed bleed air is delivered through at least one shut-off valve or control valve 25 and at least one pressure regulating valve 26 in series to the bleed air line 20 that communicates into the hollow space 7 of the displacement element 4. The valve arrangement is connected for control signal reception from a slat contour regulating or controlling unit 27, which provides control signals for controlling the valve or valves. Thereby, the inflation and deflation of the displacement element 4 is selectively controlled as will be described below. These valves can be located at any point between the bleed air system of the aircraft and the outlet of the bleed air line 20 into the displacement element 4. It should be noted that at least the portion of the bleed air line 20 extending through the telescopable tube 9 may be a flexible hose or compensating pipe connection in order to allow an adaptable movability of the components, and particularly the slat 1 relative to the wing 2.

It should be clear that the compressed bleed air provided through the control valves to the bleed air line 20 and into the hollow space 7 of the displacement element 4 selectively inflates the displacement element 4 to the required inflated or partially inflated condition. On the other hand, there must also be provision for deflating the displacement element 4. This can be achieved by closing the supply shut-off valve 25 while allowing air to vent out of the pressure regulating valve 26 located serially downstream from the control valve.

In this state, if the displacement element 4 is mechanically squeezed between the slat 1 and the wing 2 as the slat is being retracted, then the air will be squeezed out of the displacement element 4 and allowed to escape through the pressure regulating valve 26.

Alternatively, the displacement element 4 can be actively deflated and contracted by actively sucking air back out through the bleed air supply line 20, through a suitable connection to any available suction source in the aircraft. As a further alternative, a controlled or passive venting valve or pressure regulating valve 23 may be provided directly through the wall of the displacement element 4. Thereby, air can be vented out of the hollow space 7 in the event of an over-pressure inflation of the displacement element 4, or to achieve the normal collapsing of the element 4 into the contracted condition due to a squeezing force applied thereto by the slat 1 and the leading edge nose 2A of the wing 2 as the slat 1 is retracted (or due to the elastic shrinking of the element 4 itself), or in the event of a failure of the pressurization system, whereby the element 4 can be contracted even from a fully inflated and pressurized condition, when the slat 1 is retracted and thereby squeezes the element 4 between the slat 1 and the wing 2.

Figure 3:
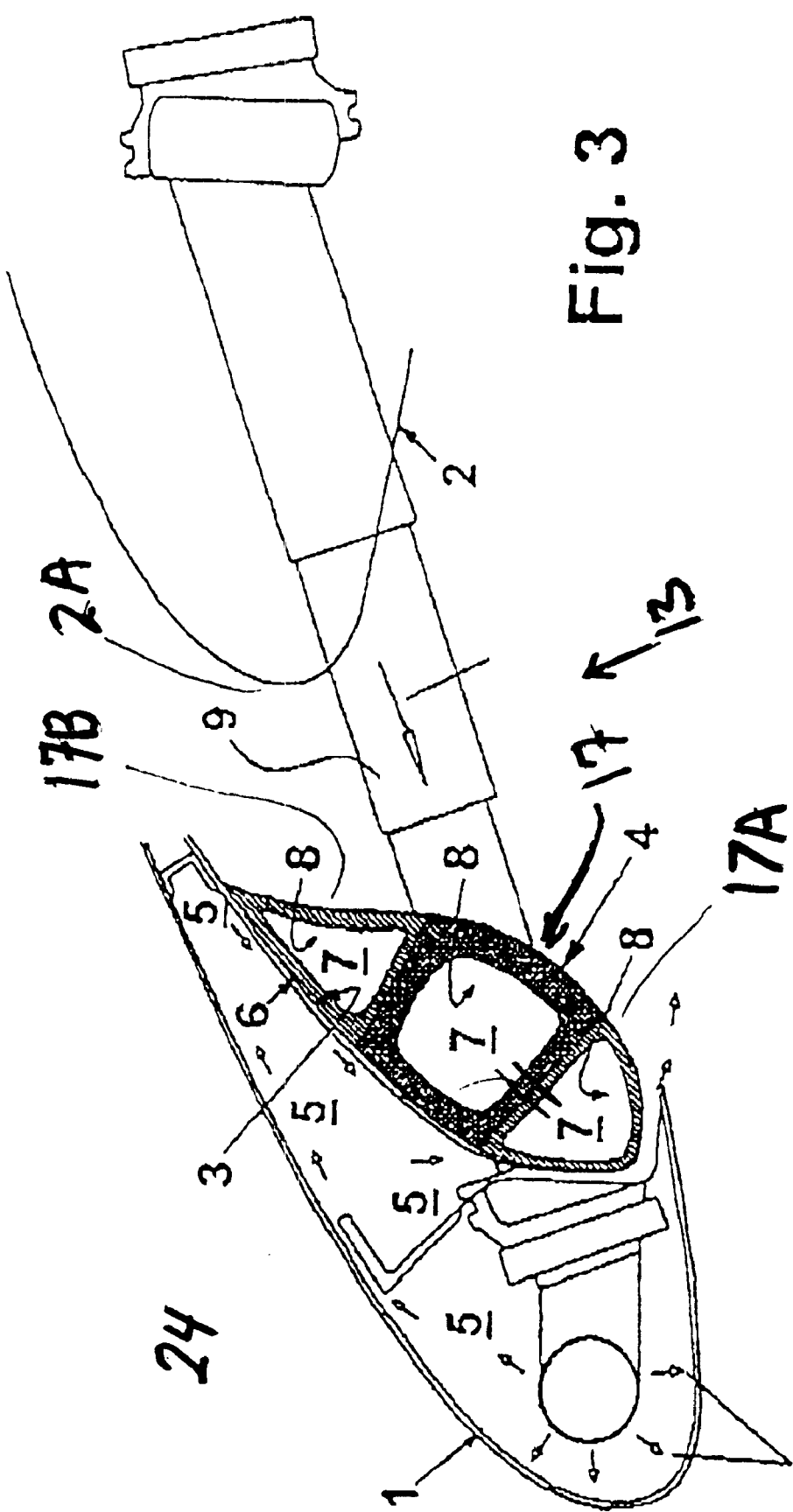
FIG. 3 is a schematic cross-sectional view similar to FIG. 2, but showing an alternative embodiment with a multi-chambered expandable displacement element rather than a single-chambered displacement element.

While FIG. 2 shows a simple single-chamber embodiment of a displacement element 4 having a single hollow space 7 therein, FIG. 3 shows an alternative of a multi-chambered displacement element 4, which has, for example, three hollow chambers 8 separated from each other in the overall hollow space 7. Preferably, the three hollow chambers 8 each respectively receive separately controlled or regulated supplies of pressurized bleed air through respective branches of the bleed air line 20 from the bleed air system of the aircraft. By separately controlling the supply of pressurized air into the three separate spaces or chambers 8, the particular sectional shape of the displacement element 4 can be controlled with greater precision.

While the expanded displacement element 4 of FIG. 2 has a general tear-drop shape defined by the material and shape of the displacement element 4 and by its pressurization condition, the three-chambered displacement element 4 of FIG. 3 may have a more complex shape, for example including a better-defined complex curvature including a convex curvature portion 17A and a concave curvature portion 17B on the rear surface 17 of the displacement element 4. Thereby, the aerodynamic flow conditions through the slat air gap 13 can be optimized for different flight conditions. Each of the chambers of this displacement element may individually be provided with a respective venting valve or pressure relief valve like the valve 23 described above. Also, a pressure compensating valve 24 may be provided in each of the dividing walls between the respective chambers 8.

Now, the operation of the inventive system or structural arrangement will be described in connection with FIGS. 1 to 3. FIG. 1 shows the state with the slat 1 retracted adjacent to the leading edge nose of the wing 2, which is generally the cruise flight configuration. In this configuration, the displacement element 4 has been deflated so that it can be accommodated in the small sickle-shaped gap between the rear surface 3 of the slat 1 and the leading edge nose 2A of the wing 2, while flexibly conforming to these two bounding surfaces and adaptively substantially filling out the gap space therebetween (for example filling at least 90% of the available gap space). The hollow space 7 within the displacement element 4 preferably contains some air in this state, to ensure that the element 4 still adaptively fills out the available space. In this state, however, the remaining air in the hollow space 7 is not under considerable pressure. Instead, the pressurized air has either been actively sucked out of the element 4 or allowed to passively escape in any of the manners described above.

For example, when the slat 1 is about to be retracted from the extended position shown in FIG. 2, the shut-off valve 25 and pressure regulating valve 26 are appropriately controlled to vent the pressurized air out of the element 4, for example under the influence of the elastic contraction of the element 4, and/or under the collapsing effect of the element 4 being squeezed between the slat 1 and the wing 2 as the slat is retracted.

Also note that the wall thickness of the element 4 can be non-uniform to help ensure the proper cross-sectional profile of the element 4 in the retracted state as shown in FIG. 1.

Then, when the slat 1 is extended into the position shown in FIG. 2, appropriate control signals are provided to the shut-off valve 25 and pressure regulating valve 26 so as to inflate the single chamber or multiple chambers 7, 8 of the displacement element 4 to achieve the desired inflated condition as shown in FIGS. 2 or 3. In this condition, the displacement element 4 fills out the concave space of the rear surface 3 of the slat 1 and improves the flow configuration through the slat air gap 13 so as to prevent or reduce the formation of a vortex 15 at the location of the displacement element 4. This configuration is generally applicable during take-off and landing of the aircraft. The exact degree of inflation of the element 4 can be adjusted, depending on the particular conditions. Then, when the slat 1 is again to be retracted, the displacement element 4 must simply be depressurized again as described above, so that the element 4 will contract or be collapsed so as to adaptively be accommodated in the remaining space between the retracted slat 1 and the leading edge nose 2A of the wing 2.

A complete system according to the invention may include a plurality of displacement members 4 respectively arranged on separate slat members of the aircraft wing, whereby each of the displacement elements 4 generally is constructed and operates as described above. However, the plural displacement elements 4 may respectively have different dimensions, different configurations, different air volume capacities, and different expansion characteristics, in order to achieve different displacement element geometries of the respective plural elements 4, at different locations or portions of the aircraft wing. Such different properties may be required, for example, in connection with an outboard slat in comparison to an inboard slat, for example due to the tapering configuration of the aircraft wing and different aerodynamic conditions at different locations.

The inventive arrangement completely avoids additional mechanical positive guide mechanisms or positioning mechanisms, and instead can entirely consist of an inflatable bag-like or tube-like displacement element 4 adhesively bonded onto the rear surface of the slat 1, and connected by a bleed air line 20 to the bleed air system of the aircraft. This provides an especially simple system, with very low cost, weight and maintenance, and also very low risk of failure or malfunction. Moreover, even in the event of a partial or complete failure of the system, the inventive system would not cause any interference to the normal operation of the slat. Namely, even if the slat is retracted while the displacement element 4 is fully inflated, the pressure relief valves will ensure that the pressurized air will be vented out of the displacement element and that the displacement element can be collapsed between the slat and the wing as the slat is retracted.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft including a source of a pressurized fluid and a wing arrangement, wherein said wing arrangement includes a wing body and a slat, said wing body terminates forwardly in a leading edge nose of said wing body, said slat has a concave rear surface facing toward said leading edge nose, and said slat is movably connected to said wing body to be movable between a retracted slat position in which said slat is adjacent to said leading edge nose with said concave rear surface facing and adjacent to said leading edge nose and an extended slat position in which said slat is spaced away from said leading edge nose with a slat air gap bounded between said slat and said leading edge nose, an improvement for reducing aero-acoustic noise generated by said wing arrangement, wherein said improvement comprises:

a hollow displacement element that encloses at least one hollow space therein and that is arranged and secured on said concave rear surface extending along said slat, and a pressurized fluid line arrangement connecting said at least one hollow space to said source of a pressurized fluid.

2. The improvement in the aircraft according to claim 1, wherein said source of a pressurized fluid comprises an aircraft bleed air system including a compressor stage of an engine, and said pressurized fluid is compressed bleed air from said compressor stage.

3. The improvement in the aircraft according to claim 2, wherein said slat has a plenum space therein, said wing arrangement further includes a hot bleed air supply duct connecting said plenum space to said aircraft bleed air system, and said pressurized fluid line arrangement includes a bleed air line that is at least partially arranged in said plenum space in said slat and that communicates into said hollow space in said displacement element through said concave rear surface.

4. The improvement in the aircraft according to claim 3, wherein said bleed air line is regulated and connected to said aircraft bleed air system separately and independently relative to said hot bleed air supply duct.

5. The improvement in the aircraft according to claim 1, wherein said improvement essentially consists of said hollow displacement element and said pressurized fluid line arrangement, and does not include any further movable mechanical parts.

6. The improvement in the aircraft according to claim 1, further comprising an adhesive that adhesively surfacially bonds and thereby secures said displacement element onto said concave rear surface.

7. The improvement in the aircraft according to claim 1, wherein said displacement element is expandable into an expanded configuration of said displacement element upon inflation thereof by introducing at least some of said pressurized fluid through said pressurized fluid line arrangement into said at least one hollow space, and contractible into a contracted configuration of said displacement element upon deflation thereof by removing at least some of said pressurized fluid from said at least one hollow space.

8. The improvement in the aircraft according to claim 7, wherein a sickle-shaped space is formed between said leading edge nose of said wing body and said concave rear surface of said slat when said slat is in said retracted slat position, said displacement element in said contracted configuration conforms to and substantially fills said sickle-shaped space when said slat is in said retracted slat position, and wherein said displacement element in said expanded configuration substantially fills a concave space bounded by said concave rear surface of said slat when said slat is in said extended slat position.

9. The improvement in the aircraft according to claim 8, wherein said displacement element in said expanded configuration has such a profile shape so as to reduce or prevent the formation of an air vortex along said slat in said slat air gap when said slat is in said extended slat position.

10. The improvement in the aircraft according to claim 7, wherein said displacement element comprises an elastically stretchable material, and is elastically stretchable into said expanded configuration and elastically shrinkable into said contracted configuration.

11. The improvement in the aircraft according to claim 7, wherein said displacement element comprises a flexible material that is form-stable to stably maintain a prescribed shape of said displacement element in said expanded configuration.

12. The improvement in the aircraft according to claim 7, wherein said displacement element comprises a gas-tight wall member and a layer of abrasion resistant material arranged on at least a partial surface area of said gas-tight wall member facing said slat air gap.

13. The improvement in the aircraft according to claim 7, wherein said displacement element comprises a gas-tight wall member and a high strength woven fabric layer laminated onto an outer surface of said wall member, and said woven fabric layer forms a stretchable and shrinkable membrane.

14. The improvement in the aircraft according to claim 7, wherein said displacement element comprises an outer wall member surrounding said at least one hollow space therein, and wherein said outer wall member has a non-uniform wall thickness that differs at different locations so as to provide a specified outer contour shape of said displacement element respectively in said contracted configuration and said expanded configuration.

15. The improvement in the aircraft according to claim 7, wherein said displacement element has a teardrop-shaped cross-sectional shape.

16. The improvement in the aircraft according to claim 7, wherein said displacement element has a front element surface with a front surface contour that permanently lies along and inversely matches a concave contour of said concave rear surface of said slat and a rear element surface with a variable rear surface contour, wherein said rear surface contour lies along and inversely conforms to a convex nose contour of said leading edge nose when said displacement element is in said contracted configuration and said slat is in said retracted slat position, and wherein said rear surface contour includes a convexly curved surface area bounding said slat air gap when said slat is in said extended slat position and said displacement element is in said expanded configuration.

17. The improvement in the aircraft according to claim 16, wherein said rear surface contour further includes a concavely curved surface area adjoining said convexly curved surface area and further bounding said slat air gap when said slat is in said extended slat position and said displacement element is in said expanded configuration.

18. The improvement in the aircraft according to claim 1, wherein said at least one hollow space includes exactly one single hollow space confined within said displacement element.

19. The improvement in the aircraft according to claim 1, wherein said at least one hollow space includes a plurality of separated hollow chambers, and wherein said pressure fluid line arrangement includes a plurality of separate pressure fluid lines that are respectively individually connected to said hollow chambers and are adapted to independently supply said pressurized fluid into said hollow chambers.

20. The improvement in the aircraft according to claim 19, wherein said displacement element includes a respective separating wall between respective adjacent ones of said hollow chambers, and a pressure compensation valve arranged in said separating wall.

21. The improvement in the aircraft according to claim 1, wherein said pressurized fluid line arrangement includes a pressurized fluid line as well as a shut-off valve and a pressure regulating valve interposed in series in said pressurized fluid line between said source of said pressurized fluid and said, hollow space of said displacement element.

22. The improvement in the aircraft according to claim 21, wherein said pressurized fluid line arrangement further comprises a slat configuration controller connected by at least one signal line to said valves to provide control signals to said valves.

23. The improvement in the aircraft according to claim 1, further comprising a pressure relief valve arranged in and penetrating through a wall of said displacement element into said hollow space.

24. The improvement in the aircraft according to claim 1, wherein said pressurized fluid line arrangement comprises a pressurized fluid line and a pressure relief valve connected thereto.

* * * * *